(12) United States Patent
Anderson et al.

(10) Patent No.: US 9,501,306 B2
(45) Date of Patent: Nov. 22, 2016

(54) PLACING VIRTUAL MACHINES IN A VIRTUAL ENVIRONMENT

(71) Applicant: International Business Machines Corporation, Armonk, NY (US)

(72) Inventors: Jason L. Anderson, San Jose, CA (US); Jeffrey L. Coveyduc, San Jose, CA (US); Andrew D. Hately, Austin, TX (US); Stefan A. G. van der Stockt, Johannesburg (ZA)

(73) Assignee: International Business Machines Corporation, Armonk, NY (US)

( * ) Notice: Subject to any disclaimer, the term of this patent is extended or adjusted under 35 U.S.C. 154(b) by 59 days.

(21) Appl. No.: 14/492,178

(22) Filed: Sep. 22, 2014

(65) Prior Publication Data

US 2016/0085573 A1   Mar. 24, 2016

(51) Int. Cl.
  *G06F 9/455*   (2006.01)
  *G06F 9/50*   (2006.01)

(52) U.S. Cl.
  CPC ......... *G06F 9/45558* (2013.01); *G06F 9/5077* (2013.01); *G06F 2009/4557* (2013.01); *G06F 2009/45595* (2013.01)

(58) Field of Classification Search
  None
  See application file for complete search history.

(56) References Cited

U.S. PATENT DOCUMENTS

| 8,276,139 | B2 | 9/2012 | Bozek et al. | |
| 2011/0225277 | A1* | 9/2011 | Freimuth | G06F 9/45558 709/223 |
| 2012/0284408 | A1 | 11/2012 | Dutta et al. | |
| 2013/0080619 | A1 | 3/2013 | Assuncao et al. | |
| 2013/0097601 | A1 | 4/2013 | Podvratnik et al. | |
| 2014/0019964 | A1* | 1/2014 | Neuse | G06F 9/45533 718/1 |
| 2015/0199208 | A1* | 7/2015 | Huang | G06F 9/45533 718/1 |

FOREIGN PATENT DOCUMENTS

EP   2437165 A1   4/2012

OTHER PUBLICATIONS

Anderson et al., "Placing Virtual Machines in a Virtual Environment," U.S. Appl. No. 14/835,888, filed Aug. 26, 2015.
List of IBM Patents or Patent Applications Treated as Related, Aug. 24, 2015, 2 pages.

(Continued)

*Primary Examiner* — Emerson Puente
*Assistant Examiner* — Jonathan R Labud
(74) *Attorney, Agent, or Firm* — Nicholas D. Bowman

(57) ABSTRACT

Virtual machines are allocated among servers in a virtual environment, whereby each virtual machine has a current placement. A current fitness score is calculated for each virtual machine based on its current placement. Proposed placement plans are then generated, each plan including a proposed placement of each virtual machine. For each plan, a plan score is created. Each plan score is created by calculating a proposed fitness score for each virtual machine based on a proposed placement of that virtual machine in accordance with that plan, generating a virtual machine score for each virtual machine based on a comparison of that virtual machine's current fitness score and proposed fitness score, and then combining the virtual machine scores. The plan scores are then compared, and a target plan is selected from among the plans. The virtual machines are then reallocated among the servers in accordance with the target proposed placement plan.

20 Claims, 9 Drawing Sheets

(56) References Cited

OTHER PUBLICATIONS

Engelbrecht, A., "Computational Intelligence—An Introduction," Second Edition, 630 pages, Wiley, ©2007, ISBN: 978-0-470-03561-0.

Mell, P. et al., "The NIST Definition of Cloud Computing," Recommendations of the National Institute of Standards and Technology, Special Publication 800-145, Sep. 2011, U.S. Department of Commerce.

Ravichandran et al., "Dynamic Scheduling of Data Using Genetic Algorithm in Cloud Computing," International Journal of Computing Algorithm, Jun. 2013, vol. 02—Issue01 ISSN: 2278-2397.

Zhong et al., "An Approach to Optimized Resource Scheduling Algorithm for Open-source Cloud Systems," 2010 Fifth Annual ChinaGrid Conference, Jul. 16-18, 2010, pp. 124-129, Guangzhou, China D.O.I. 10.1109/ChinaGrid.2010.37.

* cited by examiner

Example Plan Score Creation Chart 500

| Virtual Machine (Column 501) | Current Placement (Column 502) | Current Fitness Score (Column 503) | First Proposed Placement Plan (Column 504) | First Proposed Fitness Score (Column 505) | First Virtual Machine Score (Column 506) | Second Proposed Placement Plan (Column 507) | Second Proposed Fitness Score (Column 508) | Second Virtual Machine Score (Column 509) |
|---|---|---|---|---|---|---|---|---|
| VM 1 | Server 1 | 10 | Server 2 | 15 | 5 | Server 3 | 15 | 5 |
| VM 2 | Server 3 | 5 | Server 3 | 5 | 0 | Server 1 | 15 | 10 |
| VM 3 | Server 2 | 15 | Server 1 | 10 | -5 | Server 1 | 5 | -10 |
| VM 4 | Server 2 | 10 | Server 3 | 20 | 10 | Server 1 | 20 | 10 |
| VM 5 | Server 1 | 0 | Server 1 | 10 | 10 | Server 2 | 10 | 10 |

510 → Plan Score of First Proposed Placement Plan = 5+0+(-5)+10+10 = 20

520 → Plan Score of Second Proposed Placement Plan = 5+10+(-10)+10+10 = 25

FIG. 5

Example Plan Score Creation Chart
600

| Virtual Machine (Column 501) | Current Placement (Column 502) | Current Fitness Score (Column 503) | First Proposed Placement Plan (Column 504) | First Proposed Fitness Score (Column 505) | First Virtual Machine Score (Column 506) | Second Proposed Placement Plan (Column 507) | Second Proposed Fitness Score (Column 508) | Second Virtual Machine Score (Column 509) |
|---|---|---|---|---|---|---|---|---|
| VM 1 | Server 1 | 10 | Server 2 | 15 | 5 | Server 3 | 15 | 5 |
| VM 2 | Server 3 | 5 | Server 3 | 5 | 5 (bonus) | Server 1 | 15 | 10 |
| VM 3 | Server 2 | 15 | Server 1 | 10 | -5 | Server 1 | 5 | -10 |
| VM 4 | Server 2 | 10 | Server 3 | 20 | 10 | Server 1 | 20 | 10 |
| VM 5 | Server 1 | 0 | Server 1 | 10 | 15 (bonus) | Server 2 | 10 | 10 |

610 → Plan Score of First Proposed Placement Plan = 5+5+(-5)+10+15 = 30

520 → Plan Score of Second Proposed Placement Plan = 5+10+(-10)+10+10 = 25

FIG. 6

PLACING VIRTUAL MACHINES IN A VIRTUAL ENVIRONMENT

BACKGROUND

The present disclosure relates to virtual environments, and more specifically, to placing virtual machines in virtual environments.

The use of virtual environments has become increasingly popular in recent years in many areas of business and technology. In some situations, these virtual environments include workloads running on virtual machines that are each allocated resources from a shared pool of resources. As used herein, such a workload may refer to any application or set of applications (e.g., all of the programs running on a particular virtual machine). Further, as used herein, the concept of a virtual machine may relate to the use of a guest operating system hosted on a server, wherein the server is remote from the client-side user of the virtual machine. Within virtual environments, many different types of resources may be subject to allocation and the allocation of resources may not be equal among virtual machines, even within a single virtual environment. In some situations, this inequality may be the result of different virtual machines having different resource requirements (both in terms of resource types and resource quantities) and may also be the result of the different virtual machines being used for different purposes. In certain instances, these virtual machines may be hosted on any number of servers, which, taken together, may define the total amount of resources available in a given virtual environment.

SUMMARY

According to embodiments of the present disclosure, aspects of the disclosure may include a method, a system, and a computer program product. A plurality of virtual machines may be allocated among a plurality of servers in a virtual environment, whereby each virtual machine has a current placement in the virtual environment. A current fitness score may then be calculated for each virtual machine based on the current placement of that virtual machine. A plurality of proposed placement plans may be generated, wherein each proposed placement plan includes a proposed placement of each virtual machine. For each proposed placement plan, a plan score may be created. Each plan score may be created by calculating a proposed fitness score for each virtual machine based on a proposed placement of that virtual machine in accordance with that proposed placement plan, generating a virtual machine score for each virtual machine based on at least a comparison of that virtual machine's current fitness score and proposed fitness score, and then combining the virtual machine scores. Based on a comparison of the plan scores, a target proposed placement plan may be selected from among the proposed placement plans. The virtual machines may then be reallocated among the servers in the virtual environment in accordance with the target proposed placement plan.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 5 illustrates an example plan score creation chart that may be usable to evaluate and compare two or more proposed placement plans in an example virtual environment, in accordance with embodiments of the present disclosure.

FIG. 6 illustrates a variant of the example plan score creation chart of FIG. 5, wherein bonus quantities are used to increase the favorability plan scores corresponding to proposed placement plans that incorporate the non-movement of one or more virtual machines, in accordance with embodiments of the present disclosure.

Figure 1:
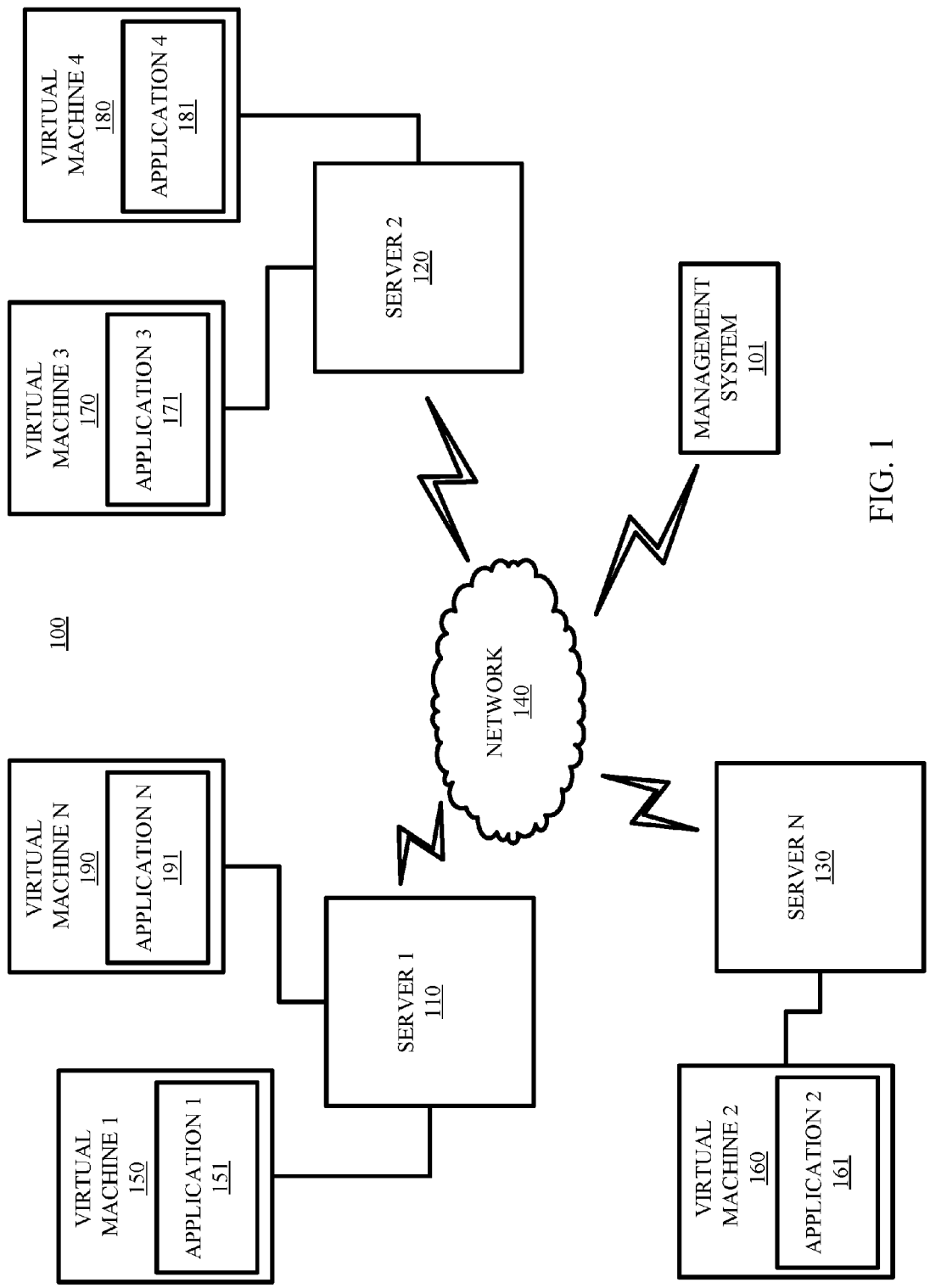
FIG. 1 illustrates a high-level block diagram of a virtual environment that may be configured to perform one or more of the methods described herein, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to placing virtual machines in virtual environments. While the present disclosure is not necessarily limited to such applications, various aspects of the disclosure may be appreciated through a discussion of various examples using this context.

The use of virtual environments may promote the sharing of resources. This may occur at least in part because in these environments many clients may share a large server or set of servers, rather than each client operating on its own server. This sharing of resources may, in turn, allow for more efficient resource allocation. Just using a virtual environment, without more, however, may not produce more efficient allocations. Instead, the intelligent placement of virtual machines among servers may be utilized. In some embodiments, this intelligent placement may incorporate the use of factors relating to how favorable a particular placement is for a particular virtual machine in order to compare two or more proposed placement plans (e.g., plans to reallocate virtual machines among the servers of the virtual environment). By making these comparisons of proposed placement plans, more optimal plans for virtual machine reallocation may be achieved. Further, in some embodiments, the proposed placement plans themselves may be generated according to one or more algorithms (e.g., genetic algorithms).

Turning now to the figures, FIG. 1 depicts a block diagram of virtual environment 100 that may be configured to perform one or more of the methods described herein. The virtual environment 100 may include a management system 101; multiple servers 110, 120, and 130; and multiple virtual machines 150, 160, 170, 180, and 190. Management system 101 may be include one or more computers including software configured to manage the use of the servers 110, 120, and 130. In some embodiments, management system may be operated by a system administrator responsible for overseeing virtual environment 100.

Servers within virtual environment 100 may host virtual machines. In the illustrated embodiment, server 110 hosts virtual machines 150 and 190, server 120 hosts virtual machines 170 and 180, and server 130 hosts virtual machine 160. These servers may be housed at the same location or may be geographically remote from each other. Each server 110, 120, and 130 may communicate with each other (and, likewise, with management system 101) through the network 140. While three servers and five virtual machines are shown for illustrative purposes in FIG. 1, it is contemplated that dozens, hundreds, or even thousands of both servers and associated virtual machines may be used in some embodiments. Further, in some embodiments, multiple virtual machines may be hosted on each server, for example, there may be a ratio of about 10 to 1, virtual machines to host severs, in the virtual environment.

Within the virtual environment 100, any number of virtual machines may be included as is represented by virtual machines 1, 2, 3, 4, and N (referenced by numerals 150, 160, 170, 180, and 190, respectively). There may be a combination of virtual machines that have existed for a substantial time in the virtual environment and other virtual machines that are newly initialized within the virtual environment. These new virtual machines may previously have been hosted by other servers outside of the virtual environment 100. Within each virtual machine, there may be an application 151, 161, 171, 181, and 191. Although it is contemplated that each virtual machine may include more than one application, single applications are depicted here for the purpose of clarity (e.g., in order to show simplified workloads). Furthermore, it is contemplated that, in some embodiments, the virtual machines may having differing sets of resource requirements, for example, where they are running different applications or applications of varying types (e.g., databases, word processing programs, gaming software, etc.).

In some embodiments, the network 140 may be implemented by any number of any suitable communications media (e.g., wide area network (WAN), local area network (LAN), Internet, Intranet, etc.). In some embodiments, the virtual environment 100 may be implemented within a cloud computing environment, or using one or more cloud computing services. As described in more detail elsewhere herein, a cloud computing environment may include a network-based, distributed data processing system that provides one or more cloud computing services.

Figure 2:
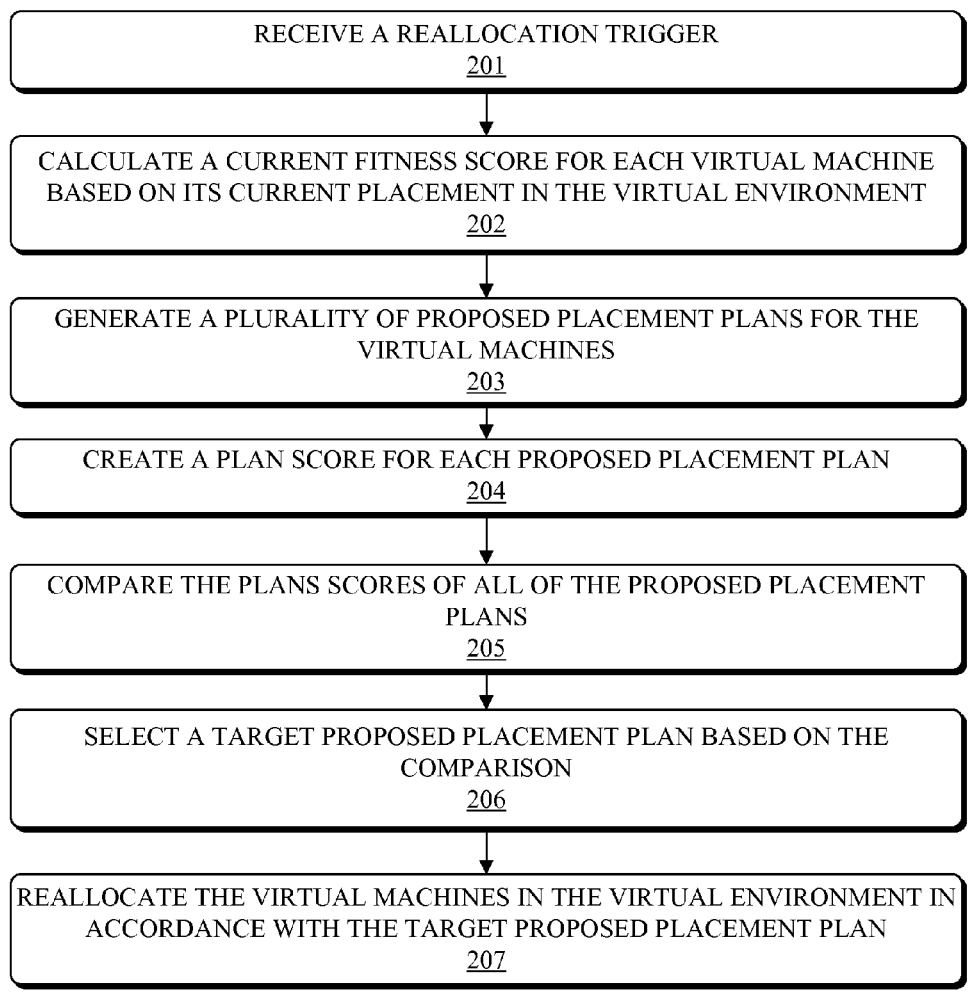
FIG. 2 illustrates a flowchart of a method for reallocating virtual machines among servers in a virtual environment, in accordance with embodiments of the present disclosure.

Turning now to FIG. 2, shown is a flowchart of a method 200 for reallocating virtual machines among servers in a virtual environment, in accordance with embodiments of the present disclosure. The method begins at block 201, where a management system may receive a reallocation trigger. This trigger may be an event or occurrence that causes a response in the management system. In some embodiments, the reallocation trigger may be received as the result of one or more criteria being met. These criteria may be linked to indicators of less than optimal virtual machine placement. For example, the initialization of a new virtual machine in the virtual environment may act as a trigger. This may occur because a new virtual machine may be associated with new or different resource requirements that are best met by reallocating some or all of the virtual machines in the environment. Another example trigger might be the energy usage by one or more servers exceeding a threshold amount. In some embodiments, there may be no triggering event per se, and the management system may instead be programmed to reevaluate virtual machine placement periodically or regularly. In response to the trigger, one or more of the remaining blocks of method 200 may be initiated, either directly or indirectly.

At block 202, a current fitness score for each virtual machine may be calculated based on its current placement in the virtual environment. In some embodiments, this current fitness score may be a quantitative measure of the quality of service and/or quantity of resources received by the virtual machine from the server on which it is currently placed. The current fitness score may take into account a number of factors. These factors may include, for example, the amount of each resource that is available to the virtual machine, the amount of latency experienced by the virtual machine (e.g., desired or average response time), the cost of the hardware utilized by the virtual machine (e.g., hosting a virtual machine on a newer server may be more favorable). Further, in some embodiments, virtual machines may be categorized as part of fitness score calculations. For example, virtual machines may be categorized based on their workload types in situations where certain types of workloads may run more efficiently when placed together (e.g., on the same server) and/or in situations where certain types of workloads may work better when separated (e.g., because similar workloads may compete for similar resources). In situations where workload type categorizations are utilized, a more favorable fitness score may be calculated in situations where this factor is more optimized. For example, when two virtual machines that run complementary types of workloads are on the same machine, both may have higher fitness scores. Other types of virtual machine categorizations are also contemplated. For example, in some embodiments, certain virtual machines may be categorized as more important (e.g., when a customer pays an added premium to ensure top-level service). In these situations, these premium virtual machines may have differently weighted (e.g., more heavily weighted) fitness scores than other virtual machines.

After current fitness scores have been calculated for the virtual machines, then, per block 203, a plurality of proposed placement plans for the virtual machines may be generated. Each proposed placement plan may include a proposed server placement for all of the virtual machines in the virtual environment. In some embodiments, these plans may be generated using method 400 shown in FIG. 4. Once generated, a plan score may be created for each proposed placement plan, per block 204. In some embodiments, these plan scores may be created using method 300 shown in FIG. 3. Once created, all of the plan scores may be compared, per block 205. Based on the comparison, a target proposed placement plan may be selected, per block 206. In some embodiments, this selection may be made by choosing the proposed placement plan associated with the highest plan score. Finally, per block 207, the virtual machines may be reallocated in the virtual environment in accordance with the target proposed placement plan. In some embodiments, very few virtual machines may be moved to new servers as part of the reallocation. This may occur, for example, in situations where the current placement of the virtual machines is already close to optimal. On the other hand, as many as all of the virtual machines may be relocated in situations where, for example, several new virtual machines are added to the virtual environment at the same time.

Figure 3:
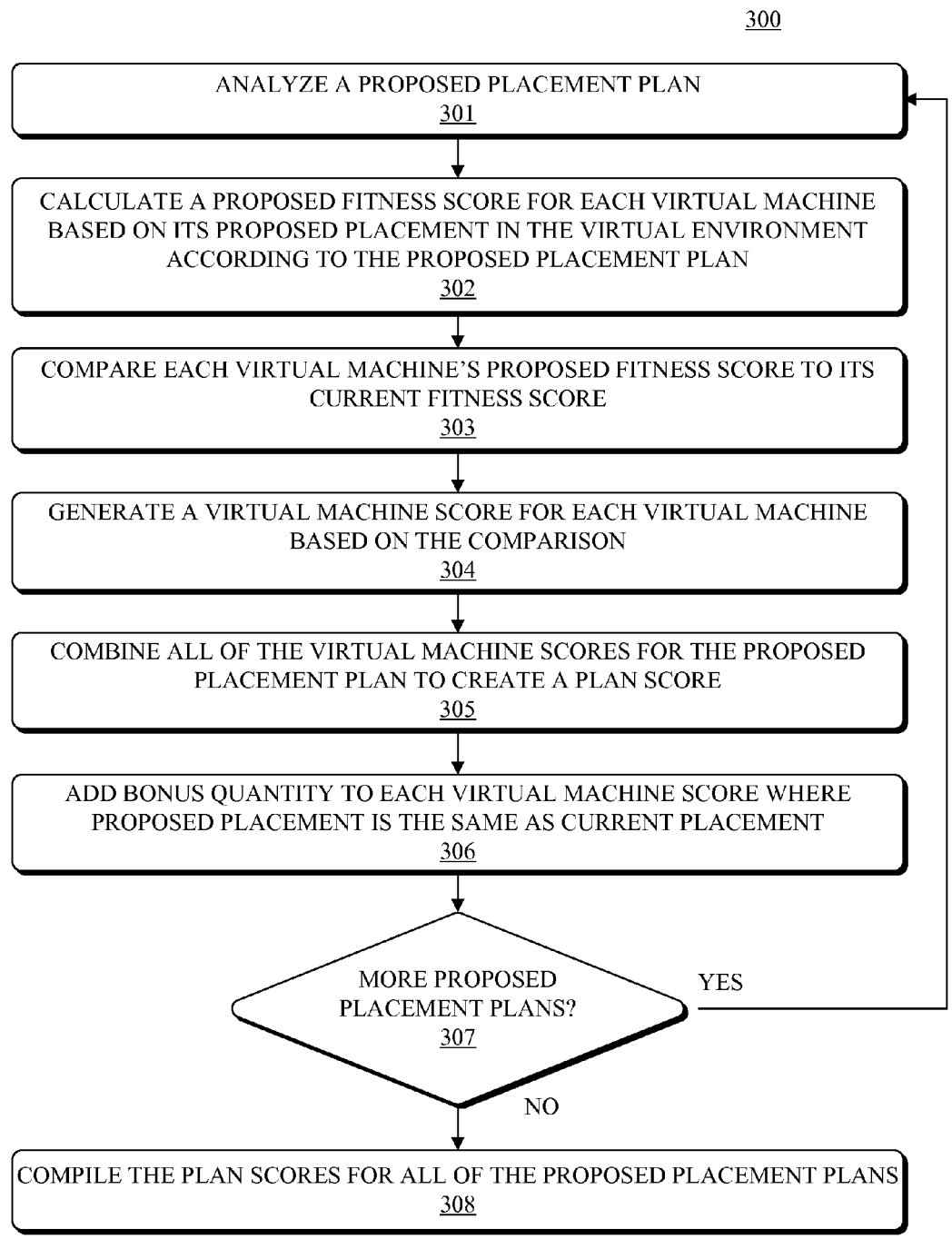
FIG. 3 illustrates a flowchart of a method for creating plan scores for a plurality of proposed placement plans for the arrangement of virtual machines, in accordance with embodiments of the present disclosure.

Turning now to FIG. 3, shown is flowchart of a method 300 of creating plan scores for a plurality of proposed placement plans, in accordance with embodiments of the present disclosure. The method may begin at block 301 with a proposed placement plan being analyzed. This analysis may include searching for and examining factors that relate to the fitness of each virtual machine as a result of that particular proposed placement plan. Per block 302, a proposed fitness score may be calculated for each virtual machine based on its proposed placement in the virtual environment according to that particular proposed placement plan. Factors that may be considered as part of each proposed fitness score may be the same or different from the factors that are considered as part of each current fitness score. These factors are discussed elsewhere herein. Once each virtual machine's proposed fitness score is calculated, it may be compared with its current fitness score, per block 303. Based on the comparison, per block 304, a virtual machine score may be generated for each virtual machine. In some embodiments, this comparison may rely on subtraction (e.g., subtracting the current fitness score from the corresponding proposed fitness score). In other embodiments, this comparison may rely on determining ratios (e.g., dividing each proposed fitness score by the corresponding current fitness score).

Next, per block 305, once all of the virtual machine scores have been created for a particular proposed placement plan, they may be combined to produce a plan score for that proposed placement plan. Per block 306, as part of the creating the plan score, a bonus quantity may be added to each virtual machine score corresponding to a virtual machine that has the same proposed placement as it does current placement (e.g., a virtual machine that is currently on a given server and is to remain on that server in accordance with this particular proposed placement plan). In some embodiments, the amount of added bonus to a particular placement may depend on the size of the virtual machine (e.g., a larger bonus quantity may be associated with a larger virtual machine).

Next, per block 307, a determination may be made as to whether there are any further proposed placement plans that have been generated but for which there has not been a plan score created. If so, the blocks 301-306 may be completed for each remaining proposed placement plan. Once plan scores have been created for each proposed placement plan, all the plan scores may, per block 308, be compiled. In some embodiments, these plan scores may then be used to select a target proposed placement for reallocating the virtual machines. This may occur, for example, using blocks 206 and 207 of method 200 of FIG. 2.

Figure 4:
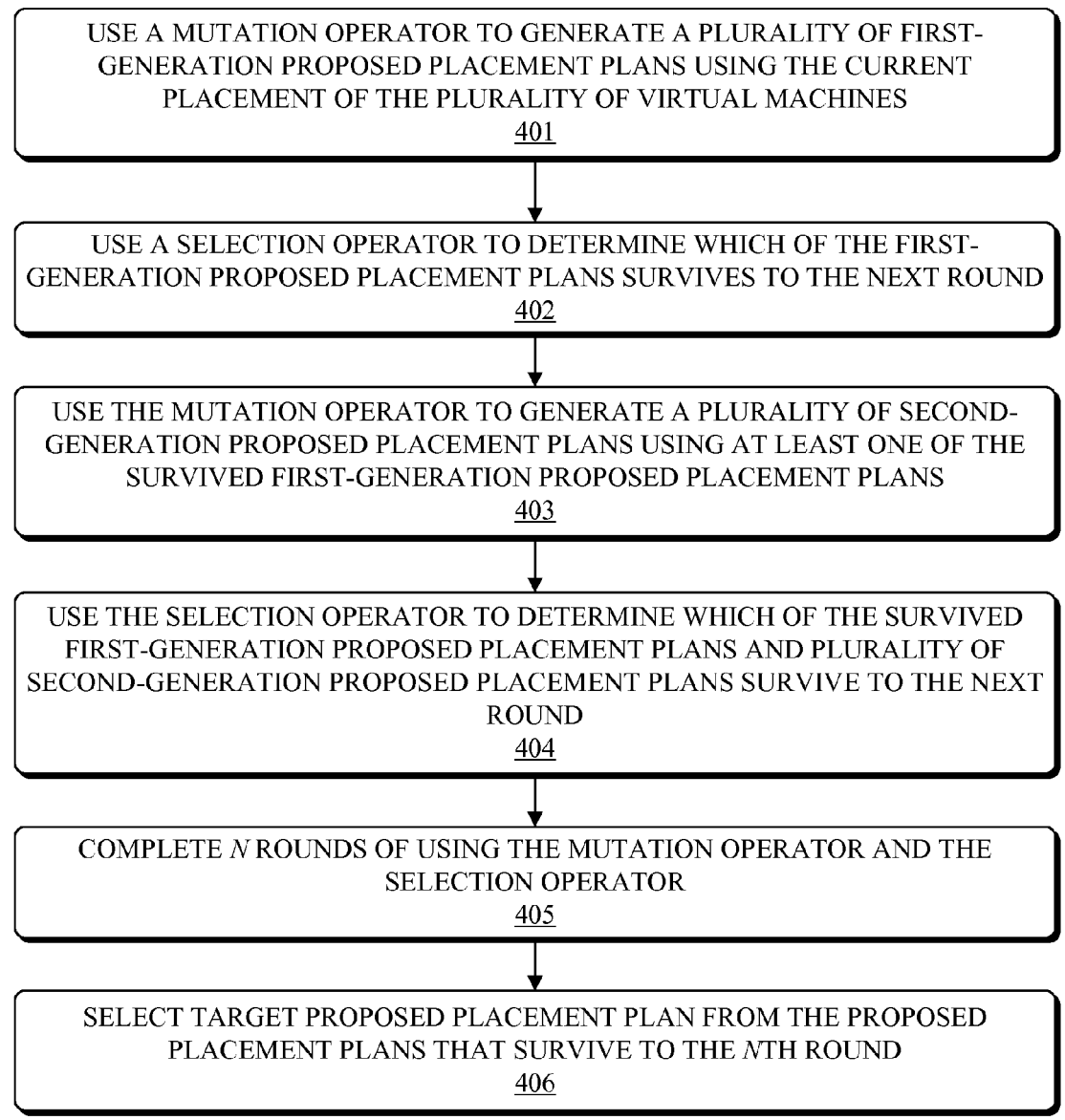
FIG. 4 illustrates a flowchart of a method for generating a plurality of proposed placement plans using evolutionary programming, in accordance with embodiments of the present disclosure.

Turning now to FIG. 4, shown is a flowchart of a method 400 for generating a plurality of proposed placement plans using evolutionary programming. As used herein, evolutionary programming may refer to the use of algorithms to generate solutions to optimization problems, wherein these algorithms are designed to emulate certain processes found in natural evolution. In some embodiments, the algorithm relied upon may be referred to as a genetic algorithm. This algorithm may essentially mutate and replicate a group of individual potential solutions to a problem to generate offspring potential solutions. The potential solutions may then be compared against each other, with the fittest individuals (e.g., those potential solutions with the highest plan scores) surviving to another round of mutation and reproduction.

Method 400 may begin at block 401, wherein a mutation operator may be used to generate a plurality of first-generation proposed placement plans. In terms of a genetic algorithm, each proposed placement plan (and potentially the current placement of the virtual machines as well) may be considered an individual organism (i.e., a potential solution to the virtual machine placement problem). In some embodiments, a mutation operator may be a function that uses randomness to generate new, different organisms from prior generated organisms. In some embodiments, the first generation of proposed placement plans may be generated using the current placement of the plurality of virtual machines as a starting point for evolution. Different types of mutation operators may be well known to those skilled in the art and may include, for example, dynamic or self-adaptive evolutionary programming mutation operators.

Next, per block 402, a selection operator may be used to determine which of the first generation of proposed placement plans survives to the next round of evolution. The selection operator may operate by comparing individual proposed placement plans based on their relative fitness. In some embodiments, the relative fitness of the plans may be represented by their corresponding plan scores. As used herein, selection operators may be of varieties that are well known to those skilled in the art and may include, for example, functions that rely on elitism, tournament selection, or non-linear ranking in order to make selections of organisms.

Next, per block 403, the mutation operator may be used to generate a plurality of second-generation proposed placement plans using at least one of the survived first-generation proposed placement plans. In some embodiments, multiple proposed placement plans may be used to generate the next generation of proposed placement plans. Further, in some embodiments, crosses between two or more proposed placement plans may be used as part of the generation of new proposed placement plans. Per block 404, the selection operator may be used to determine which of the survived first-generation of proposed placement plans and plurality of second-generation proposed placement plans survive to the next round. In some embodiments, this step may be very similar to step described in block 402 and the same techniques may be used.

Per block 405, N rounds of using the mutation operator and the selection operator may be completed, wherein N represents any positive integer. Each round may involve selecting the strongest organisms that are still alive, then generating new organisms therefrom. The purpose may be to generate organisms that are more and more fit (i.e., represent solutions that are closer and closer to optimal).

Next, per block 406, a target proposed placement plan may be selected from among the proposed placement plans that survive to the Nth round. In some embodiments, this selection may be made using a selection operator in the same manner as described above. Once selected, the target proposed placement plan may be used in the reallocation of virtual machines in the virtual environment by, for example, using block 207 of FIG. 2.

Many variants on the method 400 of FIG. 4 are contemplated. For example, in some embodiments, the number of rounds of mutation and selection N may not be predetermined prior to beginning the method, but may instead be determined based on some formula. Further, the method 400 may continue until at least one organism having a threshold relative fitness score (e.g., plan score) is generated.

With regard to method 400, it is further noted that by using at least some degree of randomness in generating proposed placement plans (i.e., by randomly generating proposed placement plans), mutation operators may aid in persevering (or introducing) diversity among proposed placement plans. Without randomness, there may be increased risks of certain problems relating to slowed or stopped evolution. For example, if proposed placement plans are generated without random mutation and instead use a more systematized method of plan generation there may be an increased chance that the proposed placement plans will relatively quickly stop noticeably improving upon each other (e.g., by not having significantly increasing plan scores through successive generations). The introduction of randomness may counter this effect and tend to increase the number of generations of proposed placement plans having individual plans that are significant improvements over prior generations.

An understanding of some embodiments of the invention described herein may be aided by reviewing additional examples. Accordingly, turning now to FIG. 5, an example plan score creation chart 500 is shown, in accordance with embodiments of the present disclosure. This plan score creation chart may be generated by using, for example, method 300 of FIG. 3, and may be helpful in improving the placement of virtual machines in the virtual environment described in the chart. In this example, the analyzed virtual environment includes, per column 501, five virtual machines (VM 1-VM 5) that are arranged on, per column 502, three servers (Server 1-Server 3). As shown, VM 1 and VM 5 are currently placed on Server 1, VM 3 and VM 4 are currently placed on Server 2, and VM 2 is currently placed on Server 3. It is contemplated that VM 1-VM 5 may correspond to Virtual Machines 1-N of FIG. 1, and Servers 1-3 may likewise correspond to Servers 1-N of FIG. 1.

To continue this example, a reallocation trigger may be received by the management system of the virtual environment (e.g., management system 101 of FIG. 1). In this particular instance, this reallocation trigger could be generated because VM 5 is newly initialized in the virtual environment and its current placement may, therefore, be poor. Once the trigger is received, a current fitness score, as shown in column 503, may be calculated for each virtual machine based on its current placement. For example, in this particular instance, a current fitness score of 10 may calculated for VM 1 based on its current placement on Server 1. As described herein, each current fitness score may vary depending on a number of factors.

Next, continuing the example, a first proposed placement plan, per column 504, may be generated and, per column 505, a corresponding first proposed fitness score may be calculated for each virtual machine. In this particular instance, the first proposed placement plan proposes that VM 1 be relocated from Server 1 to a proposed location on Server 2. The proposed fitness score for VM 1 on Server 2 for the first proposed placement plan is shown to be 15. A first virtual machine score, shown in column 506, may be calculated for each virtual machine, in this instance, by subtracting each virtual machine's first proposed fitness score from its current fitness score. For example, as shown in the chart, VM 3 has a current fitness score of 15 and first proposed fitness score of 10. When combined, these scores yield a first virtual machine score of (−5). This negative score may indicate that the current placement is better for VM 3 than its first proposed placement because, for example, there are less resources available for VM 3 under the first proposed placement plan. Once the first virtual machines scores are calculated, then, as shown in block 510, a plan score of 20 for the first proposed placement plan may be generated by adding together all of the first virtual machine scores of column 506.

It is noted that a virtual machine score for any given virtual machine may, in some embodiments, be a value other than zero even in situations where the proposed placement for that virtual machine is the same as the current placement for that virtual machine. For example, in this particular instance, the first virtual machine score for VM 5 is 10 even though the current placement of the virtual machine and first proposed placement of the virtual machine are the same. This may occur for a number of reasons; for example, a virtual machine score for a particular non-moved virtual machine may be negative in situations where more additional virtual machines are proposed to be reallocated to the server where that virtual machine is located, and thereby potentially compete with it for certain resources. The opposite may also be true (e.g., more resources available with less competition may lead to a higher proposed fitness score).

Next, in this example virtual environment, another proposed placement plan may be generated. This second proposed placement plan, shown in column 507, may be generated using the same method or a different method as compared to how the first proposed placement plan is generated. Second proposed fitness scores, per column 508, and second virtual machine scores, per column 509, may likewise be generated. As shown in block 520, the second virtual machine scores may be combined to create a plan score of 25 for the second proposed placement plan.

In this example, the plan scores may be compared and the second proposed placement plan may be selected as the target placement plan based on its higher plan score. The example may be completed when VM 1-VM 5 are reallocated in accordance with the second proposed placement plan.

While a relatively simple example is shown in FIG. 5 for the purpose of clarity, it is contemplated that the placement of any number of virtual machines on any number of servers may be improved using similar steps to those described herein. Additionally, in some embodiments, any number of proposed placement plans may be generated and compared.

Turning now to FIG. 6, shown is an example plan score creation chart 600 (a modified version of the example chart 500) that is adapted to account for advantages of the non-movement of virtual machines in a virtual environment. In this example, bonus quantities are used to increase the favorability plan scores corresponding to proposed placement plans that incorporate the non-movement of one or more virtual machines. As discussed herein, there may be advantages to not moving virtual machines among servers. For example, there may be added costs (in terms of monetary costs, downtime, etc.) that may occur when a virtual machine is moved between servers. By including a bonus quantity in the proposed fitness scores for virtual machines that are not relocated, a resulting plan score may better account for the benefits of non-movement between virtual machines, which, in turn, may aid in discovering a more optimal target placement plan.

In the example shown in FIG. 6, the plan score creation chart 600 is identical to the plan score creation chart 500 of FIG. 5 (e.g., the same proposed placement plans are evaluated under the same standards) except there is a 5-point bonus quantity added to each virtual machine score corresponding to an unmoved virtual machine. More specifically, because under the first proposed placement plan VM 2 and VM 5 are not moved from Server 3 and Server 1, respectively, a 5-point bonus is added to the first virtual machine score for both of these virtual machines. As a result of this bonus, as shown in block 610, the plan score of the first proposed placement plan is increased from 20 points to 30 points. Moreover, the plan score of the second proposed placement plan remains unchanged at 25 (because it is not affected by any bonuses). Overall, the effect of the bonus quantities is to make the plan score of the first proposed placement plan higher than the plan score of the second proposed placement plan. As a result, the virtual machines may be reallocated in the virtual environment in accordance with the first proposed placement plan, rather than the second proposed placement plan (as was suggested by the analysis shown in FIG. 5).

As discussed elsewhere herein, it is contemplated that some or all of the steps of some of the embodiments of methods described herein may be performed in alternative orders or may not be performed at all; furthermore, multiple steps may occur at the same time or as an internal part of a larger process. For example, per blocks 303-304 of method 300 of FIG. 3, comparing each virtual machine's proposed fitness score to its current fitness score and generating a virtual machine score for each virtual machine based on the comparison, may, in some embodiments, all be done as part of the creation of a plan score, rather than as separate steps having their own distinct outputs.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
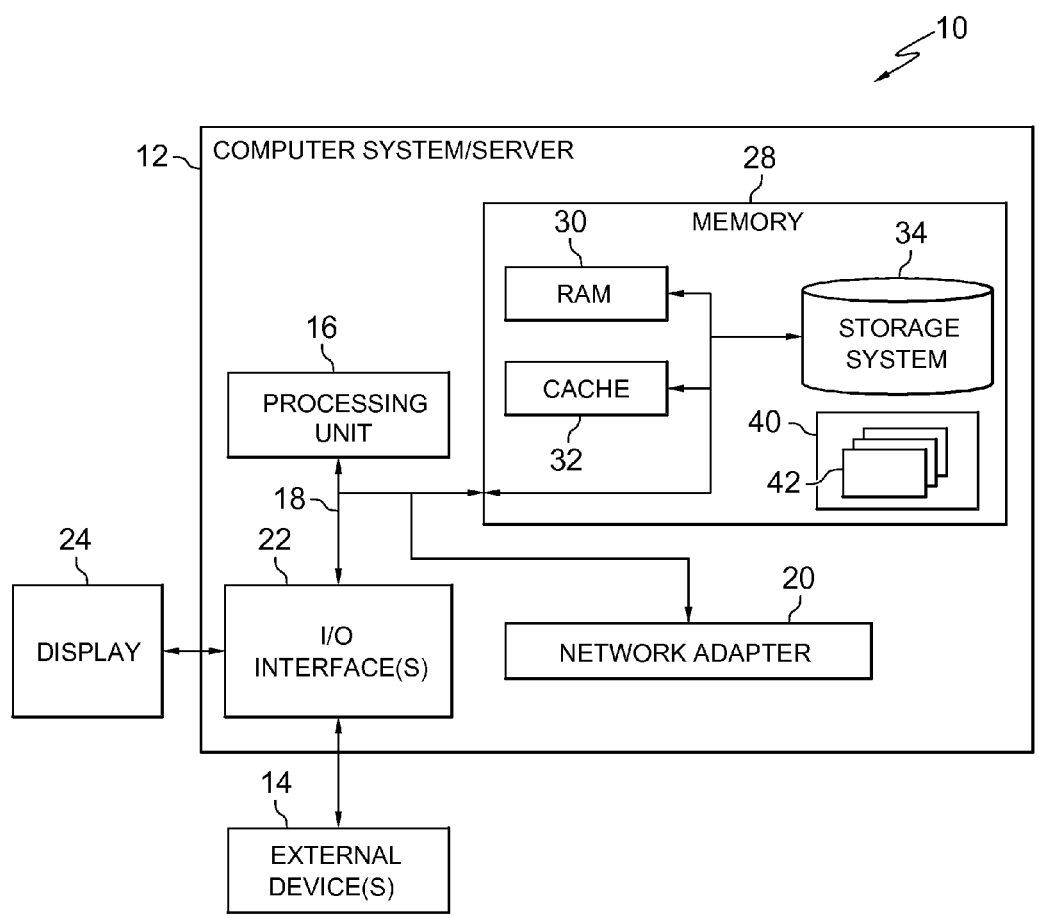
FIG. 7 illustrates a diagram of a cloud computing node, in accordance with embodiments of the present disclosure.

Referring now to FIG. 7, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. In some embodiments, it is contemplated that computer system/server 12 may be incorporated in one or more of the virtual machines or servers described in reference to the present disclosure (e.g., those servers shown in FIG. 1).

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 8:
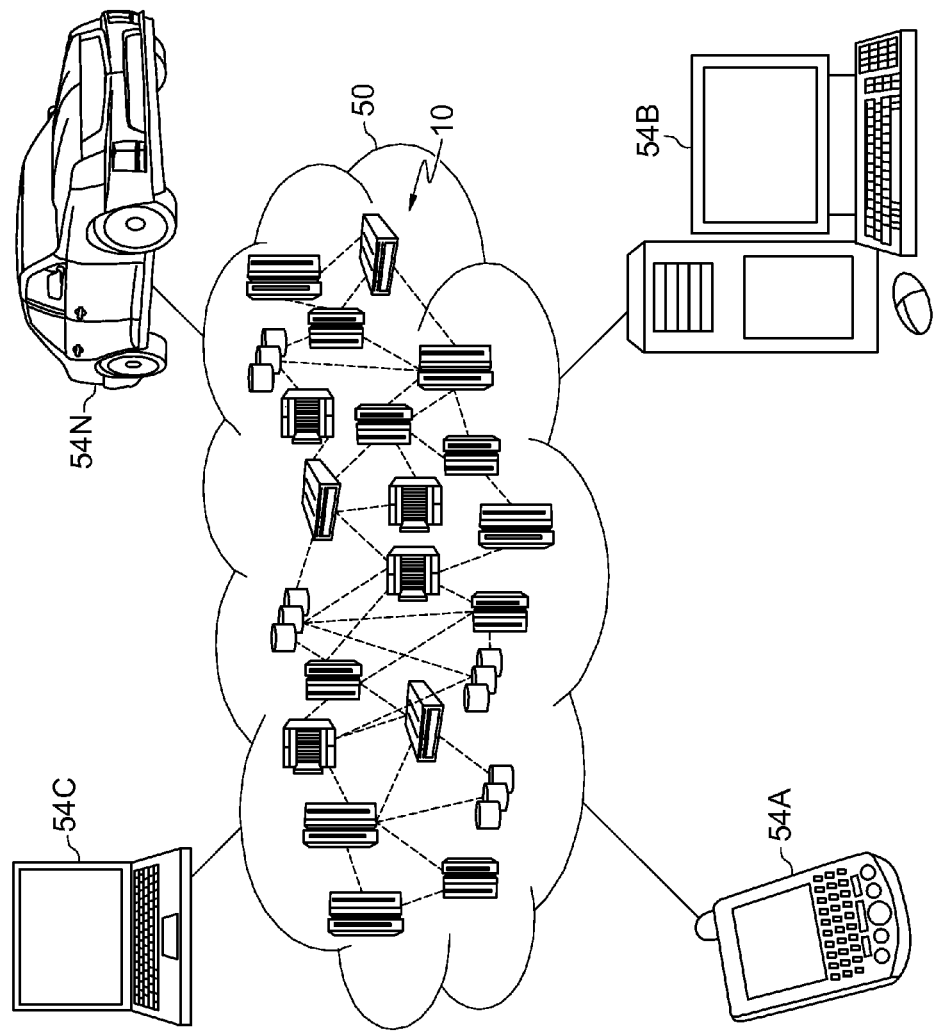
FIG. 8 illustrates a diagram of a cloud computing environment, in accordance with embodiments of the present disclosure.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser). Further, in some embodiments, the computing devices 54A-N shown in FIG. 8 may be clients used, for example, by the users of the virtual machines shown in FIG. 1.

Figure 9:
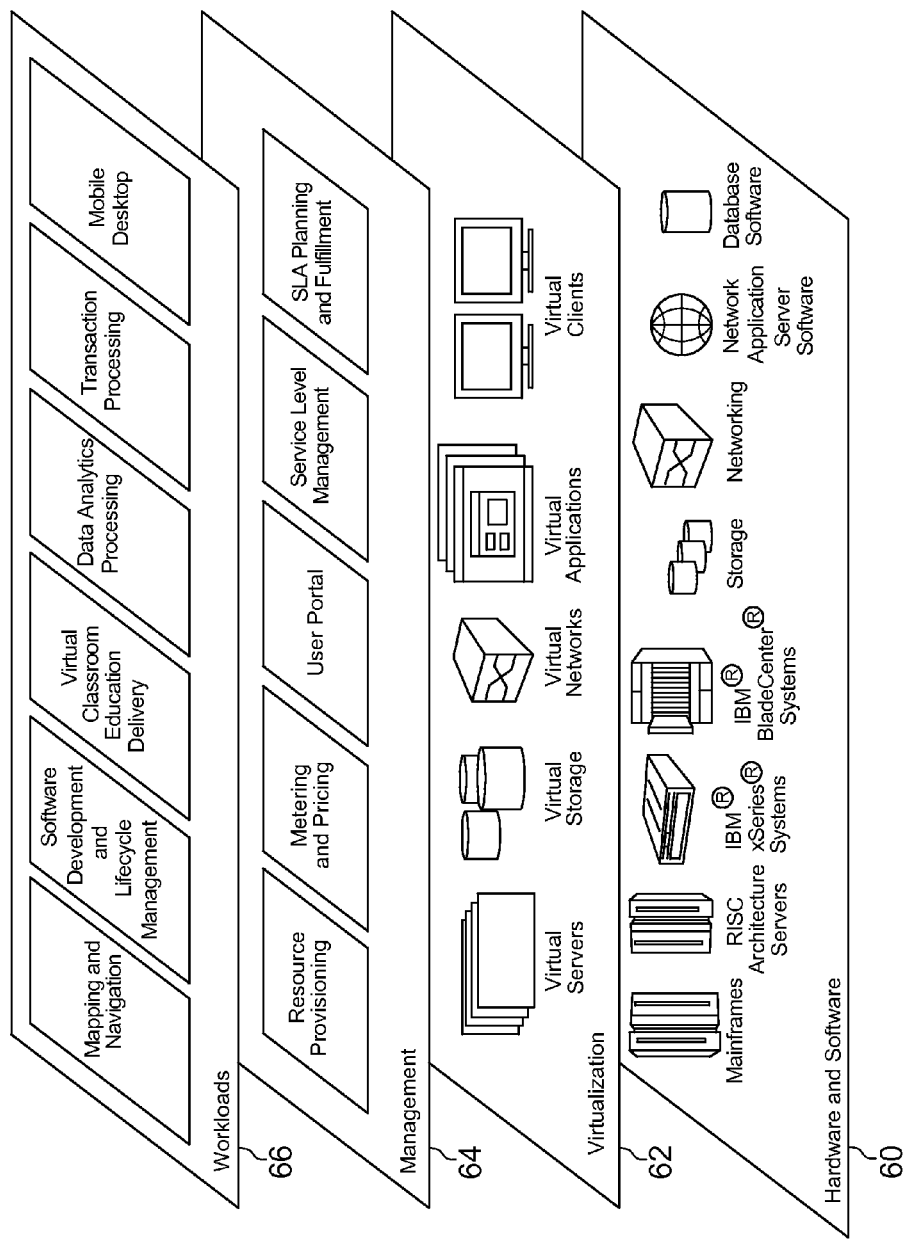
FIG. 9 illustrates a diagram of abstraction model layers, in accordance with embodiments of the present disclosure.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients. Various aspects of the present disclosure are directed toward monitoring the status of deployment components within the virtualization layer 62 using deployment patterns, as discussed in more detail herein.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. Security provides identity verification for cloud consumers and tasks, as well as protection for data and other resources. User portal provides access to the cloud computing environment for consumers and system administrators. Service level management provides cloud computing resource allocation and management such that required service levels are met. In some embodiments, such resource allocation and management may take the form of one or more of the methods described herein (e.g., methods for modifying the placement of virtual machines within virtual environments). Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; and transaction processing; and mobile desktop.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product comprising a computer readable storage medium having program instructions embodied therewith, the program instructions executable by a computer to cause the computer to:

allocate a plurality of virtual machines among a plurality of servers in a virtual environment, whereby each virtual machine of the plurality of virtual machines has a current placement in the virtual environment;

calculate a current fitness score for each virtual machine of the plurality of virtual machines based on the current placement of that virtual machine;

generate a plurality of proposed placement plans, wherein each proposed placement plan of the plurality of proposed placement plans includes a proposed placement of each virtual machine;

create for each proposed placement plan a plan score, wherein each creating the plan score includes calculating a proposed fitness score for each virtual machine based on a proposed placement of that virtual machine in accordance with that proposed placement plan, further includes generating a virtual machine score for each virtual machine based on at least a comparison of that virtual machine's current fitness score and proposed fitness score, and further includes combining the virtual machine scores;

select a target proposed placement plan from among the plurality of proposed placement plans based on a comparison of the plan scores; and reallocate the plurality of virtual machines among the plurality of servers in the virtual environment in accordance with the target proposed placement plan.

2. The computer program product of claim 1, wherein, as part of each creating the plan score, the program instructions are further executable by the computer to further cause the computer to:

increase by a bonus quantity a favorability of each virtual machine score that corresponds to a virtual machine having the same proposed placement and current placement.

3. The computer program product of claim 1, wherein the plurality of virtual machines include a first virtual machine having a set of resource requirements and a second virtual machine having a different set of resource requirements.

4. The computer program product of claim 1, wherein the plurality of proposed placement plans include a plurality of first-generation proposed placement plans and a plurality of second-generation proposed placement plans, and wherein, as part of the generating the plurality of proposed placement plans, the program instructions are further executable by the computer to further cause the computer to:

randomly generate the plurality of first-generation proposed placement plans using the current placement of the plurality of virtual machines; and randomly generate the plurality of second-generation proposed placement plans using at least one of the plurality of first generation proposed placement plans.

5. The computer program product of claim 1, wherein the plurality of proposed placement plans are generated using a genetic algorithm.

6. The computer program product of claim 1, wherein the generating the plurality of proposed placement plans occurs in response to an initialization, in the virtual environment, of a new virtual machine of the plurality of virtual machines.

7. The computer program product of claim 1, wherein, as part of the calculating the current fitness score for each virtual machine of the plurality of virtual machines based on the current placement of that virtual machine, the program instructions are executable by the computer to further cause the computer to:

analyze a plurality of factors relating to the current placement of that virtual machine, wherein one factor of the plurality of factors comprises the monetary cost of the hardware on which that virtual machine is hosted, wherein higher monetary cost of the hardware causes an increase in a favorability of that corresponding current fitness score.

8. The computer program product of claim 1, wherein each current fitness score is a quantitative measure of quality of service that a corresponding virtual machine receives based on a current placement of that virtual machine, wherein factors analyzed in calculating each current fitness score include a plurality of factors relating to that current placement of that virtual machine, and wherein one factor of the plurality of factors comprises an amount of latency experienced by that virtual machine in that current placement.

9. The computer program product of claim 8, wherein each proposed fitness score is a quantitative measure of quality of service that a corresponding virtual machine is expected to receive based on a proposed placement of that virtual machine in accordance with a corresponding proposed placement plan, wherein factors analyzed in calculating each proposed fitness score include a plurality of factors relating to that proposed placement of that virtual machine in accordance with that proposed placement plan, and wherein one factor of the plurality of factors relating to that proposed placement comprises an amount of latency expected to be experienced by that virtual machine in that proposed placement.

10. The computer program product of claim 1, wherein the generating a virtual machine score for each virtual machine based on at least a comparison of that virtual machine's current fitness score and proposed fitness score is performed such that an individualized, separate virtual machine score is generated for each virtual machine.

11. A system comprising one or more circuits configured to perform a method for placing a plurality of virtual machines among a plurality of servers in a virtual environment, the method comprising:
calculating a current fitness score for each virtual machine of the plurality of virtual machines based on a current placement of that virtual machine;
generating a plurality of proposed placement plans, wherein each proposed placement plan of the plurality of proposed placement plans includes a proposed placement of each virtual machine;
creating for each proposed placement plan a plan score, wherein each creating the plan score includes calculating a proposed fitness score for each virtual machine based on a proposed placement of that virtual machine in accordance with that proposed placement plan, further includes generating a virtual machine score for each virtual machine based on at least a comparison of that virtual machine's current fitness score and proposed fitness score, and further includes combining the virtual machine scores;
selecting a target proposed placement plan from among the plurality of proposed placement plans based on a comparison of the plan scores; and
reallocating the plurality of virtual machines among the plurality of servers in the virtual environment in accordance with the target proposed placement plan.

12. The system of claim 11, wherein, as part of each creating the plan score, the one or more circuits are further configured to perform the method comprising:
increasing by a bonus quantity a favorability of each virtual machine score that corresponds to a virtual machine having the same proposed placement and current placement.

13. The system of claim 11, wherein the plurality of virtual machines include a first virtual machine having a set of resource requirements and a second virtual machine having a different set of resource requirements.

14. The system of claim 11, wherein the plurality of proposed placement plans include a plurality of first-generation proposed placement plans and a plurality of second-generation proposed placement plans, and wherein, as part of the generating the plurality of proposed placement plans, the one or more circuits are further configured to perform the method comprising:
randomly generating the plurality of first-generation proposed placement plans using the current placement of the plurality of virtual machines; and
randomly generating the plurality of second-generation proposed placement plans using at least one of the plurality of first generation proposed placement plans.

15. The system of claim 11, wherein the plurality of proposed placement plans are generated using a genetic algorithm.

16. The system of claim 11, wherein the generating the plurality of proposed placement plans occurs in response to an initialization, in the virtual environment, of a new virtual machine of the plurality of virtual machines.

17. The system of claim 11, wherein each current fitness score is a quantitative measure of quality of service that a corresponding virtual machine receives based on a current placement of that virtual machine, wherein factors analyzed in calculating each current fitness score include a plurality of factors relating to that current placement of that virtual machine, and wherein one factor of the plurality of factors comprises an amount of latency experienced by that virtual machine in that current placement.

18. The system of claim 17, wherein each proposed fitness score is a quantitative measure of quality of service that a corresponding virtual machine is expected to receive based on a proposed placement of that virtual machine in accordance with a corresponding proposed placement plan, wherein factors analyzed in calculating each proposed fitness score include a plurality of factors relating to that proposed placement of that virtual machine in accordance with that proposed placement plan, and wherein one factor of the plurality of factors relating to that proposed placement comprises an amount of latency expected to be experienced by that virtual machine in that proposed placement.

19. The system of claim 11, wherein the generating a virtual machine score for each virtual machine based on at least a comparison of that virtual machine's current fitness score and proposed fitness score is performed such that an individualized, separate virtual machine score is generated for each virtual machine.

20. A computer program product comprising a computer readable storage medium having program instructions embodied therewith, the program instructions executable by a computer to cause the computer to:
allocate a plurality of virtual machines among a plurality of servers in a virtual environment, whereby each virtual machine of the plurality of virtual machines has a current placement in the virtual environment, and whereby the current placements of the plurality of virtual machines together comprise a current placement plan;
create for the current placement plan of the plurality of virtual machines a plan score, wherein the creating the plan score for the current placement plan includes calculating a separate fitness score for each virtual machine based on the current placement of that virtual machine in accordance with the current placement plan;

randomly generate a first new plurality of placement plans using the current placement plan, wherein the first new plurality of placement plans and the current placement plan together are a plurality of first-generation placement plans;

create for each placement plan of the first new plurality of placement plans a plan score, wherein each creating the plan score for a placement plan of the first new plurality of placement plans includes calculating a separate fitness score for each virtual machine based on a placement of that virtual machine in accordance with that placement plan;

compare the plan scores for the plurality of first-generation placement plans;

select, based on the comparing the plan scores for the plurality of first-generation placement plans, a subset of the plurality of first-generation placement plans;

randomly generate a second new plurality of placement plans using the subset of the plurality of first-generation placement plans, wherein the second new plurality of placement plans and the subset of the plurality of first-generation placement plans together are a plurality of second-generation placement plans;

create for each placement plan of the second new plurality of placement plans a plan score, wherein each creating the plan score for a placement plan of the second new plurality of placement plans includes calculating a separate fitness score for each virtual machine based on a placement of that virtual machine in accordance with that placement plan;

compare the plan scores for the plurality of second-generation placement plans;

select a target placement plan from among a plurality of nth-generation placement plans based on a comparison of plan scores for the plurality nth generation placement plans, wherein the nth-generation is a second or subsequent generation; and reallocate, from the current placement plan, the plurality of virtual machines among the plurality of servers in the virtual environment in accordance with the target placement plan.

\* \* \* \* \*